B. TAYLOR.
BODY FOR TRUCKS.
APPLICATION FILED MAR. 12, 1921.
1,388,008.
Patented Aug. 16, 1921.
3 SHEETS—SHEET 1.
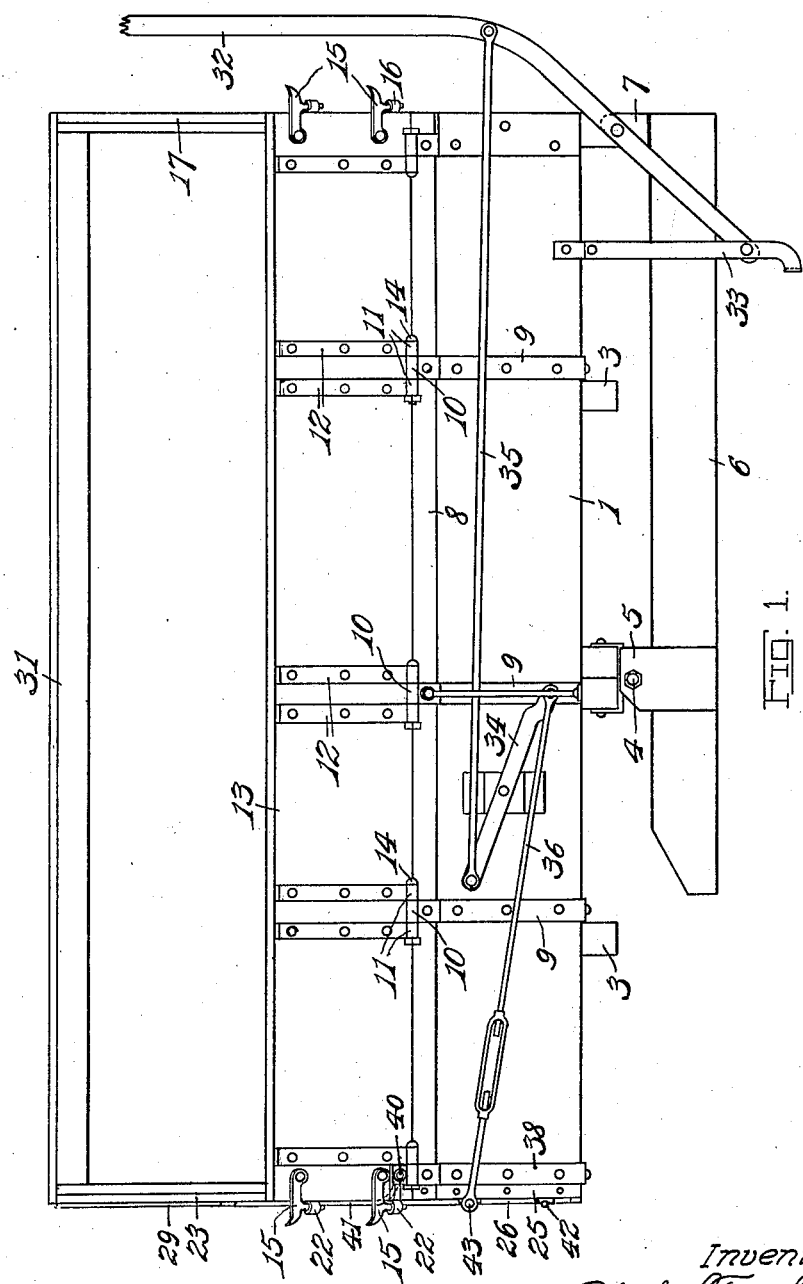

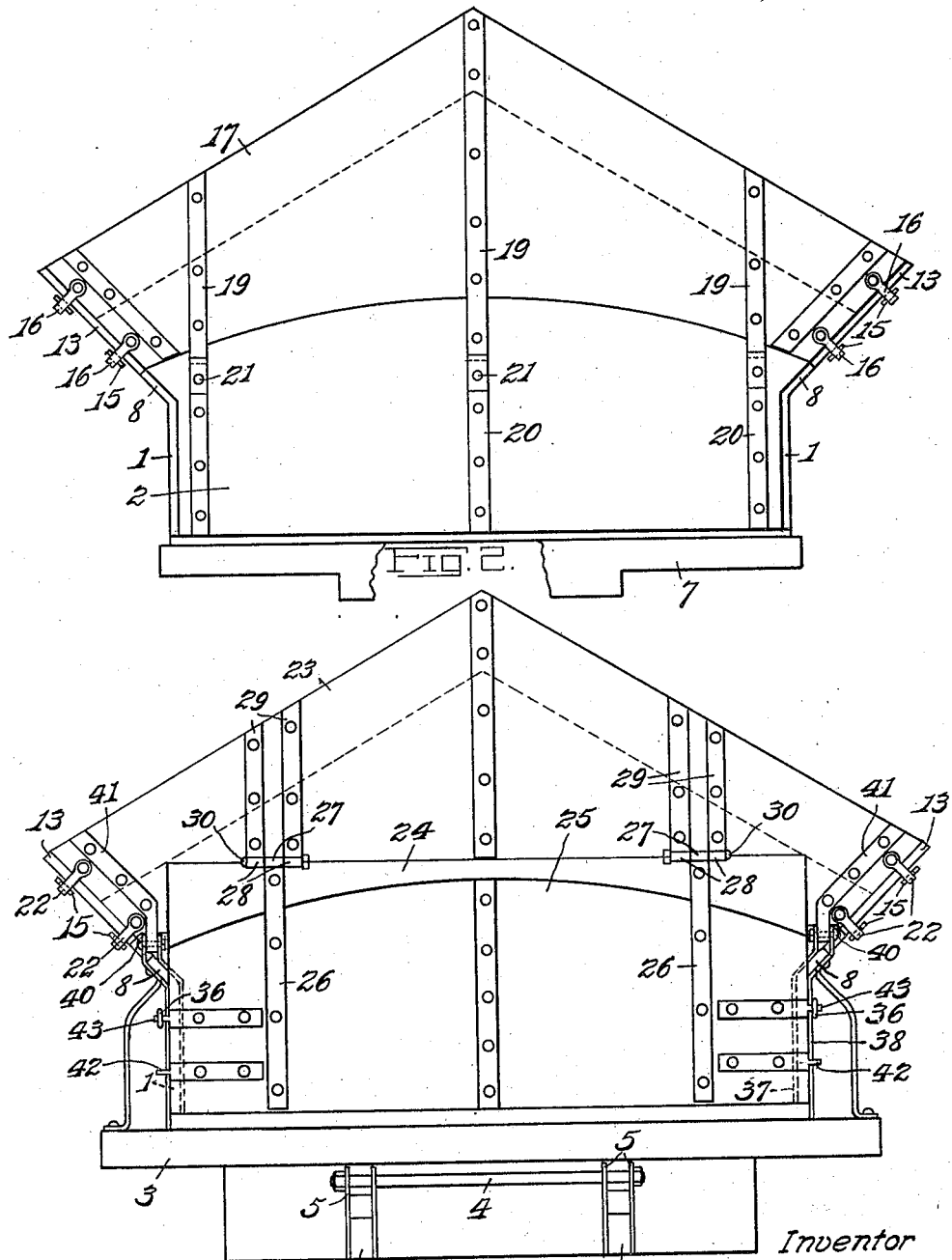

B. TAYLOR.
BODY FOR TRUCKS.
APPLICATION FILED MAR. 12, 1921.

1,388,008.

Patented Aug. 16, 1921.

Inventor
Blake Taylor.
By N. E. Dunlap,
Attorney.

UNITED STATES PATENT OFFICE.

BLAKE TAYLOR, OF ROANOKE, VIRGINIA.

BODY FOR TRUCKS.

1,388,008.   Specification of Letters Patent.   Patented Aug. 16, 1921.

Application filed March 12, 1921. Serial No. 451,732.

*To all whom it may concern:*

Be it known that I, BLAKE TAYLOR, a citizen of the United States of America, and resident of Roanoke, county of Roanoke, and State of Virginia, have invented certain new and useful Improvements in Bodies for Trucks, of which the following is a specification.

This invention relates broadly to dump bodies for trucks, and more specifically to a convertible body structure for dump trucks.

The primary object of the invention is to provide a truck body of box type and a removable superstructure therefor, said body being of an ordinary depth and having a capacity usual to bodies designed for hauling heavy materials, and said superstructure being designed for detachably mounting upon said body for materially increasing the capacity and thus to adapt the truck for hauling relatively light and bulky materials.

A further object is to provide a convertible body for trucks, comprising a permanent main body and a knock-down superstructure therefor, said superstructure having the parts thereof designed for ready and convenient application and removal.

With these and other objects in view, the invention resides in the features of construction, arrangement of parts and combinations of elements which will hereinafter be fully described, reference being had to the accompanying drawings, in which—

Figure 1 is a side elevation of a dump truck body embodying the invention;

Figs. 2 and 3 are, respectively, front and rear end elevations of the same;

Figure 4:
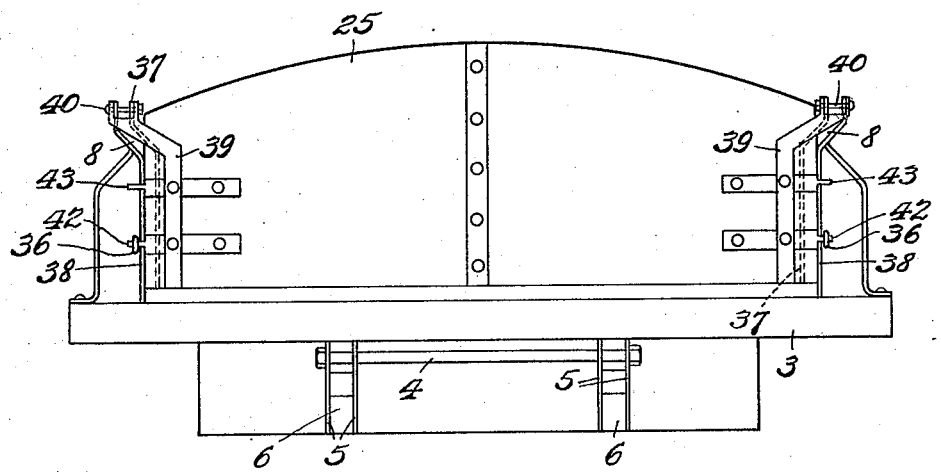
Fig. 4 is a rear end elevation of the main body with the superstructure removed.
Figure 5:
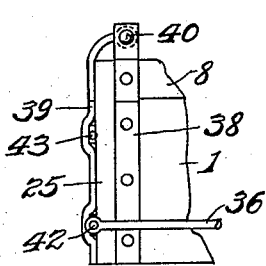
Fig. 5 is a fragmentary portion of the same in side elevation, showing the end-gate supporting means.
Figure 6:
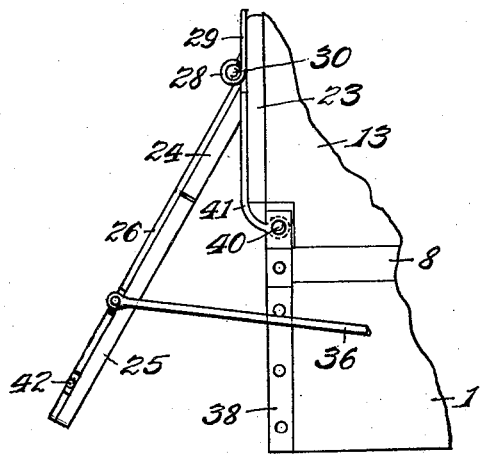
Fig. 6 is a similar view showing the end-gate as employed with the superstructure in place.

Referring to said drawings, 1 indicates the sides, and 2 the front end of a main body of an ordinary box type, the same having underlying transverse bolster-bars 3. Said body is mounted intermediate its ends upon a transverse pivot-rod or rocker 4 carried by bearing brackets 5 mounted upon sills 6, while the front end of said body normally rests upon a bolster 7 carried by said sills.

The sides 1 of the body have their upper edge portions inclined outwardly providing guards 8 of a more or less usual form. Carried on the outer faces of said sides 1 and the guards 8 is a plurality of upright metal straps 9 terminated at their upper ends by eye portions 10. Said eye portions are adapted to be received between similar eye portions 11 formed upon the lower ends of companion straps 12 carried by an extension side-board 13 which is adapted to seat upon the outer edge of the guard 8 and to occupy the same plane as the latter. The eye portions 10 and 11 are designed to occupy positions in horizontal alinement and to be attached by means of removable bolts 14, as shown in Fig. 1.

Carried by the opposite ends of each side-board 13 are latch hooks 15. The hooks at the front ends of said side-boards are adapted to interlock with eye members 16 carried by the adjacent upwardly and outwardly inclined edge portion of a front end extension member 17 which is shaped to fit between the side-boards and to seat upon the permanent front-end wall 2 of the body. Further, the extension member 17 may carry vertically disposed straps 19 adapted for bolting at their lower ends to similar straps 20 carried by said end wall 2, as shown at 21, Fig. 2.

The hooks 15 at the rear ends of the side-boards 13 are adapted in like manner to interlock with eye members 22 carried by the lateral edge portions of a rear-end wall 23 which fits within the rear end of the body with its said lateral edge portions seated upon the side-boards 13. Said rear-end wall embodies in the lower part thereof an end-gate section 24 which when said wall is in position, rests upon and is complemental to an end-gate 25 that is permanently associated with the main body. Said end-gate 25 when the main body is used without the superstructure, is hinged at each side upon a pair of metal straps 37 and 38 which are bolted to the inner and outer sides, respectively, of the sides 1 and guards 8 and which have their upper ends projecting above said guards. A supporting strap or iron 39 detachably mounted upon the end-gate 25 has its upper end bent forward and is bifurcated so that it receives between the forks thereof said projecting ends of the straps 37 and 38. A bolt 40 directed through the said ends and said forks constitutes a pivot pin upon which said end-gates swing to and from closing relation to the rear end of the main body.

When the superstructure embodying the end wall 23 is to be employed, the supporting irons 39 are removed and the bolts 40 are then employed as supports upon which rest the lower ends of irons 41 carried by the end wall 23. Also, when said end wall 23 is employed, straps 26 are bolted to the end-gate 25 and to the overlying complemental section 24, said straps being so positioned that eye portions 27 formed on their upper ends are received between similar eye portions 28 formed on the lower ends of companion straps 29, whereupon removable bolts 30 are passed through the alined eye portions. Thus, the end-gate 25 and the complemental gate section 24 are rigidly connected and are so arranged that they may be actuated as a unit, swinging upon the hinge bolts 30. The straps 26 are of course removed when the end-gate 25 is used alone.

The front-end extension member 17, as also the rear-end wall 23, preferably has its upper edge portion of inverted-V shape, and the apexes of said ends are preferably connected by a longitudinally disposed ridge-pole 31 which affords rigidity to the upper part of the superstructure constituted by the end members 17 and 23 and the opposite side-boards 13.

As is apparent, the parts composing the superstructure may be quickly applied to or removed from the main body as occasion requires, and, when applied, a greatly increased body capacity is afforded, adapting the body for hauling garbage or other bulky materials of comparatively light weight.

The dumping mechanism, consisting of an operating lever 32 pivotally attached to the front bolster 7 and having its lower end pivotally connected to an end of a link 33 which has its opposite end pivoted to the front end of the main body, is preferably connected to the end-gate 25 in such manner that the latter is automatically opened and closed as the body swings upon its rocker 4 to and from dumping position. The connecting means herein shown comprises a lever 34 pivoted intermediate its ends to a side 1 of the main body and having its opposite ends pivotally attached to the ends of rods 35 and 36, the former having its opposite end pivoted to the operating lever 32, and the latter having its opposite end pivoted to the end-gate 25. When the main body alone is used the pivotal connection between the rod 36 and the end-gate is had through pins or trunnions 42 carried by the lower of two pairs of straps carried by the end-gate. When the superstructure is used, the connection is had with the trunnions 43 of the upper pair of said straps. A turnbuckle 44 is provided whereby the length of said rod 36 may be adjusted as required.

What is claimed is—

1. A body structure for trucks, comprising a main body of box-like form, and a knock-down superstructure removably mounted thereon, said superstructure comprising side-boards adapted to seat in inclined positions upon the sides of the main body, means for attaching said side-boards to said sides, front and rear end walls fitting between said side-boards, the front wall resting upon the end wall of said main body, means detachably connecting said end walls to said side-boards, an end-gate adapted for suspension from the main body when the superstructure is omitted and for mounting on the rear end of the superstructure when the latter is used, and means for automatically actuating said end-gate to and from closing position.

2. A body structure for trucks, comprising a main body of box-like form, having a swinging end-gate and a knock-down superstructure removably mounted on said body, said superstructure comprising side-boards adapted to seat in inclined positions upon the sides of the main body, straps carried by said sides and said side-boards, means detachably connecting said straps, a rear end wall conformably fitted between said side-boards in overlying relation to said end-gate, interengaging means whereby said end-wall is detachably secured to said side-boards, hinge-like means for connecting said end-gate to said body when the superstructure is omitted, other hinge-like means for connecting said end-gate to said rear end wall of the superstructure, and means whereby said end-gate is actuated to and from closing position on either set of hinge connections.

3. A body structure for dump trucks, comprising a main body of box-like form, an end-gate for said body having hinge-like connections with the latter, means whereby said end-gate is actuated to swing on its said connections out of and into closing relation to said body with movement of the latter to and from dumping position, and a knock-down superstructure for removably mounting on said body, said superstructure comprising side-boards for mounting in outwardly inclined positions upon the sides of said body, means for detachably connecting said side-boards to said body sides, a rear end wall, fitted between said side-boards above said end-gate, interengaging means whereby said end wall is detachably secured to said side-boards, other means whereby said end wall is detachably secured to said body, the hinge-like connections of said end-gate with said body being detachable and hinge-like means for connecting said end-gate to said end wall when the first-mentioned connections are detached, said end-gate swinging means being also adapted for actuating said end-gate to swing on the last-mentioned connections.

4. A body structure for dump trucks, comprising a main body of box-like form, an end-gate for said body, supports carried by said body and adapted to have said end-gate pivotally mounted thereon, a knockdown superstructure adapted to be removably mounted on said body; said superstructure comprising side-boards for mounting upon the sides of said body, means for detachably connecting said side-boards to said body-sides, and a rear end wall adapted to fit between said side-boards above said end-gate; interengaging means whereby said end wall may be detachably secured to said side-boards, means whereby said end wall may be mounted upon said supports when the end-gate is detached from the latter, means for pivotally connecting said end-gate to said end wall, and means for swinging said end-gate from and to closing relation to the body as the latter is actuated to and from dumping position, respectively.

5. A body structure for dump trucks, comprising a main body of box-like form, an end-gate for said body, supports carried by said body and adapted to have said end-gate pivotally mounted thereon, a knockdown superstructure adapted to be removably mounted on said body; said superstructure comprising side-boards for mounting upon the sides of said body, means for detachably connecting said side-boards to said body-sides, and a rear end wall adapted to fit between said side-boards above said end-gate; interengaging means whereby said end wall may be detachably secured to said side-boards, means whereby said end wall may be mounted upon said supports when the end-gate is detached from the latter, means for pivotally connecting said end-gate to said end wall, and means for swinging said end-gate from and to closing relation to the body as the latter is actuated to and from dumping position, respectively, the last-mentioned means being attachable to said end-gate at one elevation when the gate is suspended from said supports and at another elevation when the gate is suspended from the end wall of the superstructure.

6. A body structure for dump trucks, comprising a main body of box-like form, an end-gate for said body, supports carried by said body and adapted to have said end-gate pivotally mounted thereon, a knockdown superstructure adapted to be removably mounted on said body; said superstructure comprising side-boards for mounting upon the sides of said body, means for detachably connecting said side-boards to said body-sides, and a rear end wall adapted to fit between said side-boards above said end gate; a gate section adapted to seat upon said end-gate in complemental relation to the latter, straps for rigidly attaching said end-gate and said section in said relation, means for attaching said straps in hinged gate-suspending relation to said end wall, means for attaching said end wall to said supports when the end gate is detached from the latter, and means attachable to said end-gate for actuating the latter to swing on its supporting means from and to closing position as the body is moved to and from dumping position.

In testimony whereof I affix my signtaure in presence of two subscribing witnesses.

BLAKE TAYLOR.

Witnesses:
WARREN WELLFORD,
H. G. HUSPE.